United States Patent Office 3,037,015
Patented May 29, 1962

3,037,015
THERAPEUTICALLY VALUABLE COMPOUNDS
AND PROCESS OF PRODUCING SAME
Hermann Rudy, Heidelberg, and Friedrich Krueger, Hamburg, Germany, assignors to Joh. A. Benckiser G.m.b.H. Chemische Fabrik, Ludwigshafen (Rhine), Germany, a corporation of Germany
No Drawing. Filed July 20, 1959, Ser. No. 828,025
Claims priority, application Germany July 19, 1958
11 Claims. (Cl. 260—211)

The present invention relates to therapeutically valuable compounds and more particularly to well tolerated compounds and to a process of producing such compounds.

In co-pending application Serial No. 703,746, filed December 19, 1957, for "Isonicotinic Acid Hydrazide Derivatives," now abandoned, there are described processes of producing new compounds having a high activity of considerable therapeutic range and/or processes for converting compounds which have valuable therapeutic activity but undesirable toxic effects due to the presence of one or more reactive groups, such as the hydroxyl, carbonyl, mercapto, amino, imido, organic or inorganic acid groups. or halogen, into substances which have a reduced toxicity. To reduce their toxicity and to improve their activity such relative groups are blocked by reaction with low molecular carbohydrates containing amino groups or with derivatives of such amino carbohydrates, more particularly by reaction with amino sacharides, such as glucosamine, galactosamine, and derivatives thereof. The reaction between compounds carrying amino groups and the carbonyl groups of amino carbohydrates or their derivatives takes place under conditions of condensation whereby the amino group of the amino carbohydrates is used in a protected, i.e. substituted form. Such condensation of physiologically effective compounds with toxic reactive groups and amino carbohydrates or their derivatives yields condensation products, and/or molecular addition compounds, and/or addition compounds, and/or clathrate compounds.

It is one object of the present invention to provide new and valuable compounds of excellent therapeutical activity and considerably reduced toxicity.

Other objects of the present invention and advantageous features thereof will become apparent as the description proceeds.

In principle, the present invention consists in reacting quinone or compounds with quinone groups and their derivatives with amino carbohydrates. Thereby, the toxicity of such quinones and their derivatives is considerably reduced.

According to the present invention amino carbohydrates and their N- and/or O-substitution products in general as well as other derivatives thereof are readily reacted with quinones, respectively quinone derivatives, by mixing the reactants preferably in solution in a solvent. The reactants may also be present in suspension. The reaction takes place at room temperature or at slightly increased temperature or at temperature of boiling water. Isolation and purification of the reaction products is carried out according to conventional methods.

Unsubstituted quinones, such as benzoquinone, react with 2 moles of amino carbohydrates, such as glucosamine, according to the following equation:

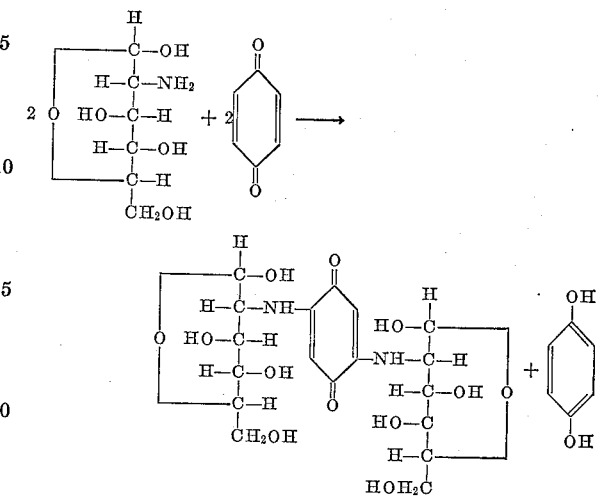

Substituted quinones, such as chloranil, react with amino carbohydrates, for instance, wtih 2 moles of D-glucosamine, according to the following equation, in which case it is preferred to use an excess of 2 moles of glucosamine in order to remove the hydrogen chloride formed in the reaction.

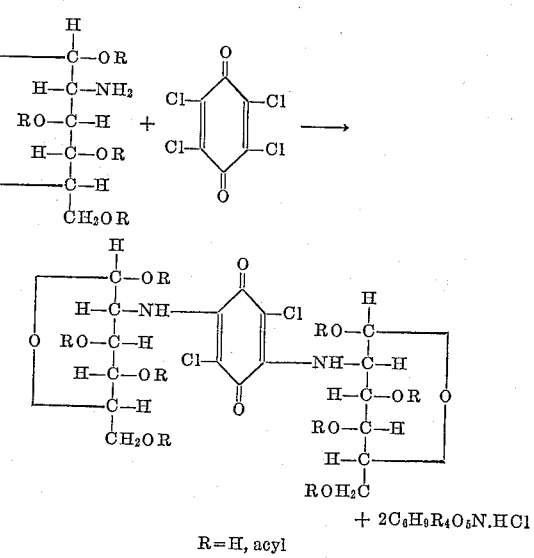

$R = H$, acyl

Quinones which may be used as the one reactant, include benzoquinone, naphthoquinone, or other quinones derived from isocyclic and heterocyclic compounds as well as their substitution products, the substituents comprising, for instance, halogens, alkoxy groups, alkyl mercapto groups, and the like, although the present invention is not limited thereto.

The following amino carbohydrates and their derivatives can be employed as the other reactant. They are also given only as examples without, however, limiting the scope of the present invention thereto.

Amino monosaccharides, such as:
- Glucosamine,
- Isoglucosamine,
- Galactosamine,
- Sorbosylamine,
- Tagatosamine,
- Xylosamine,
- Lyxosamine,
- Allosamine,
- Altrosamine,
- Mannosamine,
- Iodosamine,
- Gulosamine,
- Talosamine,
- 3-amino-3-desoxy ribose,
- 2-amino-2-desoxy mannose,
- 2-amino-2-desoxy gulose,
- 2-amino-2-desoxy altrose,
- 3-amino-3-desoxy glucose,
- 3-amino-3-desoxy idose,
- 4-amino-3-desoxy mannose
- 6-amino-6-desoxy galactose,
- 6-amino-desoxy glucose,
- And others.

Amino disaccharides, such as:
- 4-β-D-galactosido-D-glucosamine,
- 6-β-D-galactosido-D-glucosamine,
- 6-β-D-glucosaminido-D-glucose,
- 6-β-D-glucosaminido-D-galactose,
- And others.

The following examples serve to illustrate the process according to the present invention without, however, limiting the same thereto.

*Example 1*

3.6 g. of D-glucosamine and 1.1 g. of p-benzoquinone (molar ratio 2:1) are heated in 100 cc. of methanol on a water bath for 2 hours. Glucosamine is dissolved and the solution becomes dark. The solution is filtered after cooling. On concentrating the filtrate, a black crystalline substance is obtained which does not melt, even at a temperature of 300° C. Its analysis shows that the compound contains 2 moles of glucosamine per 1 mole of quinone. The compound may also be the quinhydrone-like adduct of diglucosaminyl hydroquinone and diglucosaminyl quinone.

When changing the ratio of reactants, for instance, when using 3.6 g. of glucosamine and 4.3 g. of quinone (molar ratio 1:2) a lower yield is obtained than with the above given ratio.

*Example 2*

4.0 g. of chloranil are dissolved in 400 cc. of dimethyl formamide. 11.6 g. of solid D-glucosamine (4 moles) are added and the mixture is shaken until the glucosamine has dissolved. After several hours the intensely violet colored solution is filtered whereby almost no filter residue remains. The filtered solution is concentrated at room temperature. At first almost the theoretical amount of glucosamine hydrochloride is isolated and, thereafter, the reaction product which can be recrystallyzed from water. It is obtained in the form of gray-violet crystals which are soluble in hot water or alcohol with a violet color. The compound does not melt, even at a temperature of 300° C. and contains 2 moles of crystal water.

In place of D-glucosamine there may be employed O-acyl derivatives of amino carbohydrates, such as tetra-O-acetyl D-glucosamine. In this case the reaction product is obtained in form of red crystals, M.P. 193° C. under decomposition.

It is also possible to obtain this substance by acetylation of the quinone derivative (described in Example 2) with acetic anhydride in pyridine.

It is understood, that the reaction can be carried out with other quinone compounds as well as with other amino carbohydrates as those given hereinabove. Likewise, other solvents and reaction temperatures and durations than those mentioned may be used whereby it is a matter of carrying out simple preliminary tests for determining optimum reaction conditions. Many changes and variations in the reaction components, the reaction conditions, temperature, duration, the solvents used, the methods of working up the reaction products and of purifying the same, and the like may be made by those skilled in the art in accordance with the principles set forth herein and in the claims annexed hereto.

As stated above, the new compounds are useful as therapeutic agents and permit the administration of quinone-like compounds which heretofore could not be administered due to their toxic effects. For instance, the antibiotics fumigatin, usnic acid, and the like are considerably detoxified by reaction with amino carbohydrates according to the present invention.

2,5-bis-(3 - diethylamino propylamino) benzoquinone bis-benzylchloride, which is used as muscle relaxant and has a curare-like activity, forms also less toxic condensation products with amino carbohydrates such as glucosamine. The anthelmintic compound rapanone isolated from *Rapanea maxmowiczii* Koidz is also condensed, for instance, with glucosamine to a well tolerated compound. 4-benzoquinone and chloranil are used in the leather industry for tanning. Their condensation products according to the present invention are considerably less irritating than the free compounds. The condensation product with chloranil, for instance, has proved to be substantially as effective as chloranil itself in combatting plant pests and as seed disinfectant although it does not have a harmful effect on the skin. 2,5-dihydroxy-1,4-benzoquinone, which is used as antioxidant, stabilizer for plastics and oils, organic carrier for pharmaceutically administered heavy metals, is also preferably used in the form of its condensation products with amino carbohydrates according to the present invention. It is, of course, understood that the large group of benzo- and naphthoquinone dyestuffs, such as the dyestuffs known as Helindone yellow CG, Helindone brown CM and CRD, Helindone red CR, Anthrasol yellow HCG, and others form, on condensation with amino carbohydrates, condensation products which are quite stable and have interesting tinctorial properties.

Of interest are also the condensation products of amino carbohydrates with 5-hydroxy-1,4 - naphthoquinone or juglone isolated from walnut shells, and 2-hydroxy-1,4-naphthoquinone or lawsone, the coloring matter of hennae leaves, which are useful in cosmetic preparations, for instance, in suntan oils or, respectively, for dyeing hair, skin, fingernails. It is evident, that the present invention is useful for many purposes. The preparation of the new condensation products proceeds in the same manner as described in the preceding examples. Ordinarily the resulting condensation products are water soluble and can be used in the form of their aqueous solutions. They may, of course, also be applied in powder and the like solid form.

We claim:

1. The condensation products of a quinone compound and an amino carbohydrate compound selected from the group consisting of an amino monosaccharide and an amino disaccharide.

2. The condensation product of p-benzoquinone and D-glucosamine.

3. The condensation product of chloranil and D-glucosamine.

4. In a process of producing a condensation product of a quinone compound and an amino carbohydrate compound, the steps which comprise adding a quinone compound to an amino carbohydrate compound selected from the group consisting of an amino monosaccharide and an amino disaccharide and allowing the mixture to react until condensation is substantially completed.

5. In a process of producing a condensation product of a quinone compound and an amino carbohydrate compound, the steps which comprise dissolving a quinone compound in an organic solvent therefor, adding thereto an amino carbohydrate compound selected from the group consisting of an amino monosaccharide and an amino disaccharide, and allowing the mixture to react until condensation is substantially completed.

6. In a process of producing a condensation product of a quinone compound and an amino carbohydrate compound, the steps which comprise dissolving a quinone compound in a lower alkanol, adding thereto an amino carbohydrate compound selected from the group consisting of an amino monosaccharide and an amino disaccharide, allowing the mixture to stand until the amino carbohydrate compound is dissolved, and isolating the reaction product from the resulting solution.

7. In a process of producing a condensation product of a quinone compound and an amino carbohydrate compound, the steps which comprise dissolving a quinone compound in dimethyl formamide, allowing the mixture to stand until the amino carbohydrate compound selected from the group consisting of an amino monosaccharide and an amino disaccharide is dissolved, and isolating the reaction product from the resulting solution.

8. The process according to claim 5, wherein an excess of the amino carbohydrate compound is added.

9. The process according to claim 5, wherein the mixture is allowed to stand at elevated temperature.

10. In a process of producing a condensation product of a quinone compound and an amino carbohydrate compound, the steps which comprise suspending a quinone compound and an amino carbohydrate compound selected from the group consisting of an amino monosaccharide and an amino disaccharide in an organic solvent suspending agent and allowing the mixture to stand until reaction between said quinone compound and said amino carbohydrate compound is substantially completed.

11. In a process of producing a condensation product of a quinone compound and D-glucosamine, the steps which comprise dissolving a quinone compound in an organic solvent therefor, adding thereto D-glucosamine in the ratio of 2 moles of D-glucosamine to 1 mole of the quinone, and allowing the mixture to react until condensation is substantially completed.

References Cited in the file of this patent

Karrer: Organic Chemistry, 4th English Edition, pp. 577–8 (1950), Elsevier Publishing Co., New York City.